(No Model.)
F. S. SHIRLEY.
GLASSWARE.
No. 268,738.  Patented Dec. 5, 1882.
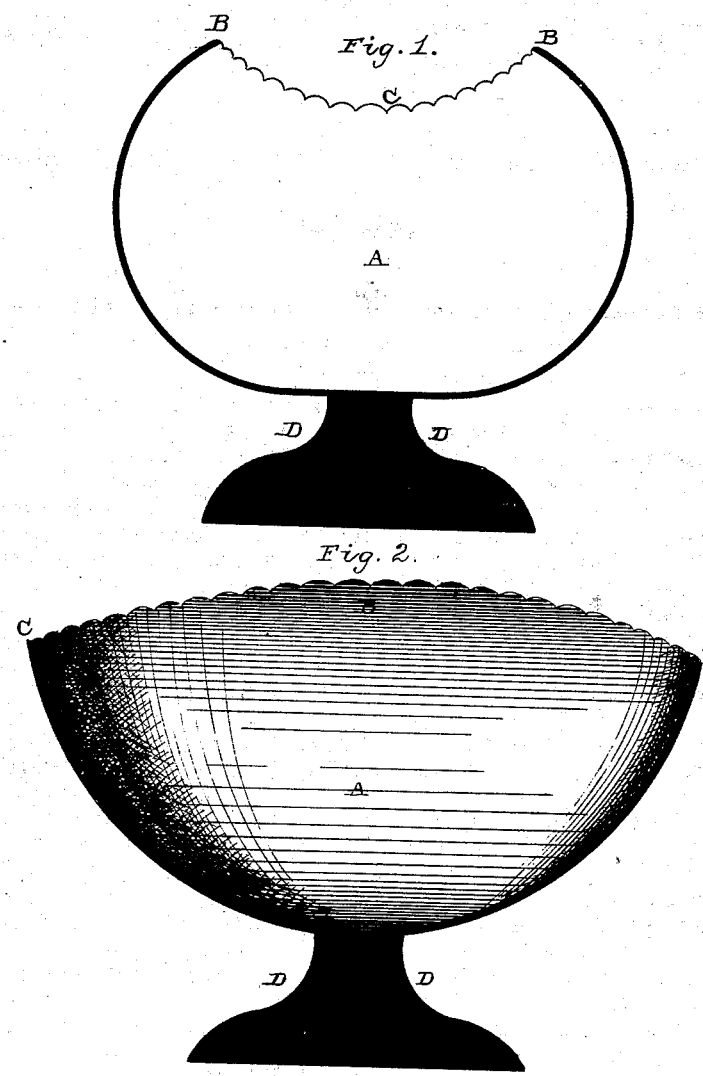
Witnesses.
Robt. Johnson
Chas R Wright
Inventor.
J. S. Shirley
per
F. A. Lehmann,
Atty.

UNITED STATES PATENT OFFICE.

FREDERICK S. SHIRLEY, OF NEW BEDFORD, MASSACHUSETTS.

GLASSWARE.

SPECIFICATION forming part of Letters Patent No. 268,738, dated December 5, 1882.

Application filed July 1, 1882. (No model.)

*To all whom it may concern:*

Be it known that I, FRED. S. SHIRLEY, of New Bedford, in the county of Bristol and State of Massachusetts, have invented certain new and useful Improvements in Glassware; and I do hereby declare the following to be a full, clear, and exact description of the invention, such as will enable others skilled in the art to which it pertains to make and use it, reference being had to the accompanying drawings, which form part of this specification.

My invention relates to an improvement in dishes; and it consists in a dish having its edges curved inwardly so as to prevent the contents from being spilled upon the table while being taken out with a spoon, as will be more fully described hereinafter.

The object of my invention is to so shape dishes of all kinds that the contents, while being removed with a spoon, will have a tendency to fall over into the spoon or back into the dish instead of being crowded over the edges, as is the case with ordinary plates and dishes.

Figures 1 and 2 are vertical sections of a dish embodying my invention, the figures being taken through the center of the dish and at right angles to each other.

A represents a glass dish, of any desired shape or size, which has its side edges, B, turned or inclined inwardly, so as to project over the body. These edges are raised considerably above the ends C, where the dish is made oblong; but should it be desired to make the dish nearly round the edge may be inclined or curved inward at three, four, or more different points. In this case there will be a recess or cavity between the edges, as shown. These inclined sides B prevent the berries or other substance which is being taken out with a spoon from being pushed over the edges of the dish upon the table. While the spoon is being inserted, owing to the inwardly-inclined sides of the dish, the berries or other substance will fall over directly into the spoon or will drop back into the dish after the spoon is removed.

The dish may be made either with or without handles, and may either be provided with suitable bases or feet, D, or other suitable form of base may be formed directly upon the bottom of the dish itself. These dishes may be ornamented in any suitable manner and mounted upon bases made of any suitable metal that may be preferred. I do not limit myself to the exact shape and form here shown, for that may be varied slightly without departing from the spirit of my invention.

Having thus described my invention, I claim—

A dish or bowl, made of glass or other similar material, having curved inwardly-inclined edges, with depressed portions between the curved parts, substantially as described.

In testimony whereof I affix my signature in presence of two witnesses.

FREDK. S. SHIRLEY.

Witnesses:
ROBERT G. TOBEY,
CHAS. F. SWIFT.